United States Patent
Daniel

(10) Patent No.: US 9,608,702 B2
(45) Date of Patent: Mar. 28, 2017

(54) SUPPORTING DISTINCT SINGLE-INPUT SINGLE-OUTPUT (SISO) SERVICES IN A MULTIPLE-INPUT MULTIPLE-OUTPUT (MIMO) BASEBAND CIRCUIT, PARTICULARLY SUITED FOR A DISTRIBUTED ANTENNA SYSTEM (DAS)

(71) Applicant: Corning Optical Communications Wireless Ltd, Airport (IL)

(72) Inventor: Liav Moshe Daniel, Gedera (IL)

(73) Assignee: Corning Optical Communications Wireless Ltd, Airport (IL)

( * ) Notice: Subject to any disclaimer, the term of this patent is extended or adjusted under 35 U.S.C. 154(b) by 0 days.

(21) Appl. No.: 14/983,860

(22) Filed: Dec. 30, 2015

(65) Prior Publication Data

US 2016/0365901 A1    Dec. 15, 2016

Related U.S. Application Data

(60) Provisional application No. 62/173,165, filed on Jun. 9, 2015.

(51) Int. Cl.
*H04B 7/06* (2006.01)
*H04B 7/0413* (2017.01)
(Continued)

(52) U.S. Cl.
CPC ......... *H04B 7/0413* (2013.01); *H04B 1/0003* (2013.01); *H04L 65/60* (2013.01)

(58) Field of Classification Search
CPC ...... H04B 7/0413; H04B 1/0003; H04L 65/60
(Continued)

(56) References Cited

U.S. PATENT DOCUMENTS

| | | | |
|---|---|---|---|
| 8,971,210 B1* | 3/2015 | Murali | H04B 7/0413 370/254 |
| 2004/0037565 A1* | 2/2004 | Young | H04B 10/25752 398/115 |

(Continued)

OTHER PUBLICATIONS

PCT/US2011/043405 by Berlin, filed on Jul. 8, 2011 and published on Jan. 17, 2013 (parent application for US 2014/0126914 A1).*

*Primary Examiner* — Siu Lee
(74) *Attorney, Agent, or Firm* — C. Keith Montgomery

(57) ABSTRACT

One embodiment of the disclosure relates to supporting distinct single-input single-output (SISO) services in a multiple-input multiple-output (MIMO) baseband circuit, particularly suited for a distributed antenna system (DAS). In this regard, in one aspect, two communication paths in the MIMO baseband circuit are reconfigured to distribute two distinct SISO signals. A quadrature modulator modulates the two distinct SISO signals to two different radio frequency (RF) bands, respectively, based on a modulation frequency. In another aspect, the two or more distinct SISO signals are provided to the quadrature modulator using two intermediate frequencies (IFs) that are determined based on the center frequencies and bandwidths of the two different RF bands. By reconfiguring the MIMO baseband circuit to distribute the two distinct SISO signals, it is possible to retro-support new wireless communication services and/or new RF bands in existing DAS installations without replacing the MIMO baseband circuit.

21 Claims, 9 Drawing Sheets

(51) Int. Cl.
*H04L 29/06* (2006.01)
*H04B 1/00* (2006.01)

(58) Field of Classification Search
USPC .......................... 375/259, 260, 267, 295, 299
See application file for complete search history.

(56) References Cited

U.S. PATENT DOCUMENTS

| | | |
|---|---|---|
| 2006/0034217 A1 | 2/2006 | Kwon et al. |
| 2009/0316609 A1* | 12/2009 | Singh .................... H04B 7/2609 370/280 |
| 2011/0019723 A1 | 1/2011 | Lerner et al. |
| 2012/0099497 A1 | 4/2012 | Vaidya et al. |
| 2012/0149411 A1 | 6/2012 | Miyoshi et al. |
| 2013/0242836 A1 | 9/2013 | Vaidya et al. |
| 2013/0300470 A1* | 11/2013 | Mohajeri ............... H03L 7/1075 327/157 |
| 2013/0343251 A1 | 12/2013 | Zhang |
| 2014/0072064 A1* | 3/2014 | Lemson ........... H04B 10/25753 375/267 |
| 2014/0126914 A1* | 5/2014 | Berlin .................. H04B 7/0413 398/116 |
| 2014/0133589 A1 | 5/2014 | Ouchi et al. |
| 2014/0146915 A1 | 5/2014 | Ouchi et al. |
| 2014/0355527 A1 | 12/2014 | Vaidya et al. |
| 2015/0304013 A1 | 10/2015 | Ouchi et al. |
| 2015/0351036 A1 | 12/2015 | Vaidya et al. |

* cited by examiner

US 9,608,702 B2

SUPPORTING DISTINCT SINGLE-INPUT SINGLE-OUTPUT (SISO) SERVICES IN A MULTIPLE-INPUT MULTIPLE-OUTPUT (MIMO) BASEBAND CIRCUIT, PARTICULARLY SUITED FOR A DISTRIBUTED ANTENNA SYSTEM (DAS)

PRIORITY APPLICATION

This application claims the benefit of priority under 35 U.S.C. §119 of U.S. Provisional Application No. 62/173,165, filed on Jun. 9, 2015, the content of which is relied upon and incorporated herein by reference in its entirety.

BACKGROUND

The disclosure relates generally to distribution of communications signals in a distributed antenna system (DAS), and more particularly to supporting distinct single-input single-output (SISO) streams using a multiple-input multiple-output (MIMO) baseband circuit.

Wireless customers are increasingly demanding digital data services, such as streaming video signals. Concurrently, some wireless customers use their wireless communication devices in areas that are poorly serviced by conventional cellular networks, such as inside certain buildings or areas where there is little cellular coverage. One response to the intersection of these two concerns has been the use of DASs. DASs can be particularly useful when deployed inside buildings or other indoor environments where the wireless communication devices may not otherwise be able to effectively receive radio frequency (RF) signals from a source. DASs include remote antenna units (RAUs) configured to receive and transmit communications signals to client devices within the antenna range of the RAUs.

As the wireless spectrum becomes more crowded, RAUs in DASs are increasingly relying on MIMO antenna technology to achieve higher data rates. One technique that enables the MIMO antennas to provide higher data rates is known as spatial multiplexing. In spatial multiplexing, a high-rate signal is split into multiple streams and provided to multiple antennas for simultaneous transmissions in the same RF band. Because MIMO antenna technology is becoming prevalent in wireless communications, commercially available MIMO baseband circuits have been designed to facilitate MIMO integration in the wireless communication devices. In addition, commercially available MIMO baseband circuits can make it more cost effective to support MIMO in the wireless communication devices. However, if commercially available MIMO baseband circuits are not suited for the desired application or functionality, a customized baseband circuit may have to be designed and fabricated at increased design time and cost.

No admission is made that any reference cited herein constitutes prior art. Applicant expressly reserves the right to challenge the accuracy and pertinency of any cited documents.

SUMMARY

One embodiment of the disclosure relates to supporting distinct single-input single-output (SISO) services in a multiple-input multiple-output (MIMO) baseband circuit. The support of distinct SISO services in a MIMO baseband circuit may be particularly suited for a distributed antenna system (DAS). In this regard, in one aspect, a MIMO baseband circuit is provided. The MIMO baseband circuit comprises two communication paths designed to distribute two communication streams that correspond to the same wireless services and occupy the same radio frequency (RF) band. In one aspect, the two communication paths in the MIMO baseband circuit are reconfigured to distribute two distinct SISO signals that correspond to two different wireless services and occupy two different RF bands. A quadrature modulator modulates the two distinct SISO signals to the two different RF bands, respectively, based on a modulation frequency. In another aspect, the two or more distinct SISO signals are provided to the quadrature modulator using two intermediate frequencies (IFs) that are determined based on the center frequencies and bandwidths of the two different RF bands. By configuring the MIMO baseband circuit to distribute the two distinct SISO signals, it is possible to support new wireless communication services and/or new RF bands in existing DAS installations without replacing the MIMO baseband circuit.

An additional embodiment of the disclosure relates to a MIMO baseband circuit configured to support distinct SISO services. The MIMO baseband circuit comprises a first MIMO path configured to distribute a first SISO signal. The MIMO baseband circuit also comprises a second MIMO path configured to distribute a second SISO signal. The MIMO baseband circuit also comprises a first quadrature modulator comprising a first SISO signal input coupled to the first MIMO path. The first SISO signal input is configured to receive the first SISO signal. The MIMO baseband circuit also comprises a second quadrature modulator comprising a second SISO signal input coupled to the second MIMO path. The second SISO signal input is configured to receive the second SISO signal. The first quadrature modulator is also configured to modulate the first SISO signal to a first RF band based on a modulation frequency. The second quadrature modulator is also configured to modulate the second SISO signal to a second RF band that is different from the first RF band based on the modulation frequency.

An additional embodiment of the disclosure relates to a method for supporting distinct SISO services in a MIMO baseband circuit. The method comprises receiving a first SISO signal on a first MIMO path. The method also comprises receiving a second SISO signal on a second MIMO path. The method also comprises modulating the first SISO signal to a first RF band based on a modulation frequency. The method also comprises modulating the second SISO signal to a second RF band that is different from the first RF band based on the modulation frequency.

An additional embodiment of the disclosure relates to a DAS. The DAS comprises a head-end equipment (HEE). The HEE is configured to receive a first SISO signal and a second SISO signal. The DAS also comprises a plurality of remote antenna units (RAUs) communicatively coupled to the HEE by an optical fiber-based communications medium. At least one RAU among the plurality of RAUs comprises an adaptive MIMO communication system. The adaptive MIMO communication system is configured to receive and modulate the first SISO signal to generate a first RF signal for distribution on a first RF band. The adaptive MIMO communication system is further configured to receive and modulate the second SISO signal to generate a second RF signal for distribution on a second RF band that is different from the first RF band.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

One embodiment of the disclosure relates to supporting distinct single-input single-output (SISO) services in a multiple-input multiple-output (MIMO) baseband circuit. The support of distinct SISO services in a MIMO baseband circuit may be particularly suited for a distributed antenna system (DAS). In this regard, in one aspect, a MIMO baseband circuit is provided. The MIMO baseband circuit comprises two communication paths designed to distribute two communication streams that correspond to the same wireless services and occupy the same radio frequency (RF) band. In one aspect, the two communication paths in the MIMO baseband circuit are reconfigured to distribute two distinct SISO signals that correspond to two different wireless services and occupy two different RF bands. A quadrature modulator modulates the two distinct SISO signals to the two different RF bands, respectively, based on a modulation frequency. In another aspect, the two or more distinct SISO signals are provided to the quadrature modulator using two intermediate frequencies (IFs) that are determined based on the center frequencies and bandwidths of the two different RF bands. By configuring the MIMO baseband circuit to distribute the two distinct SISO signals, it is possible to support new wireless communication services and/or new RF bands in existing DAS installations without replacing the MIMO baseband circuit.

Figure 1:
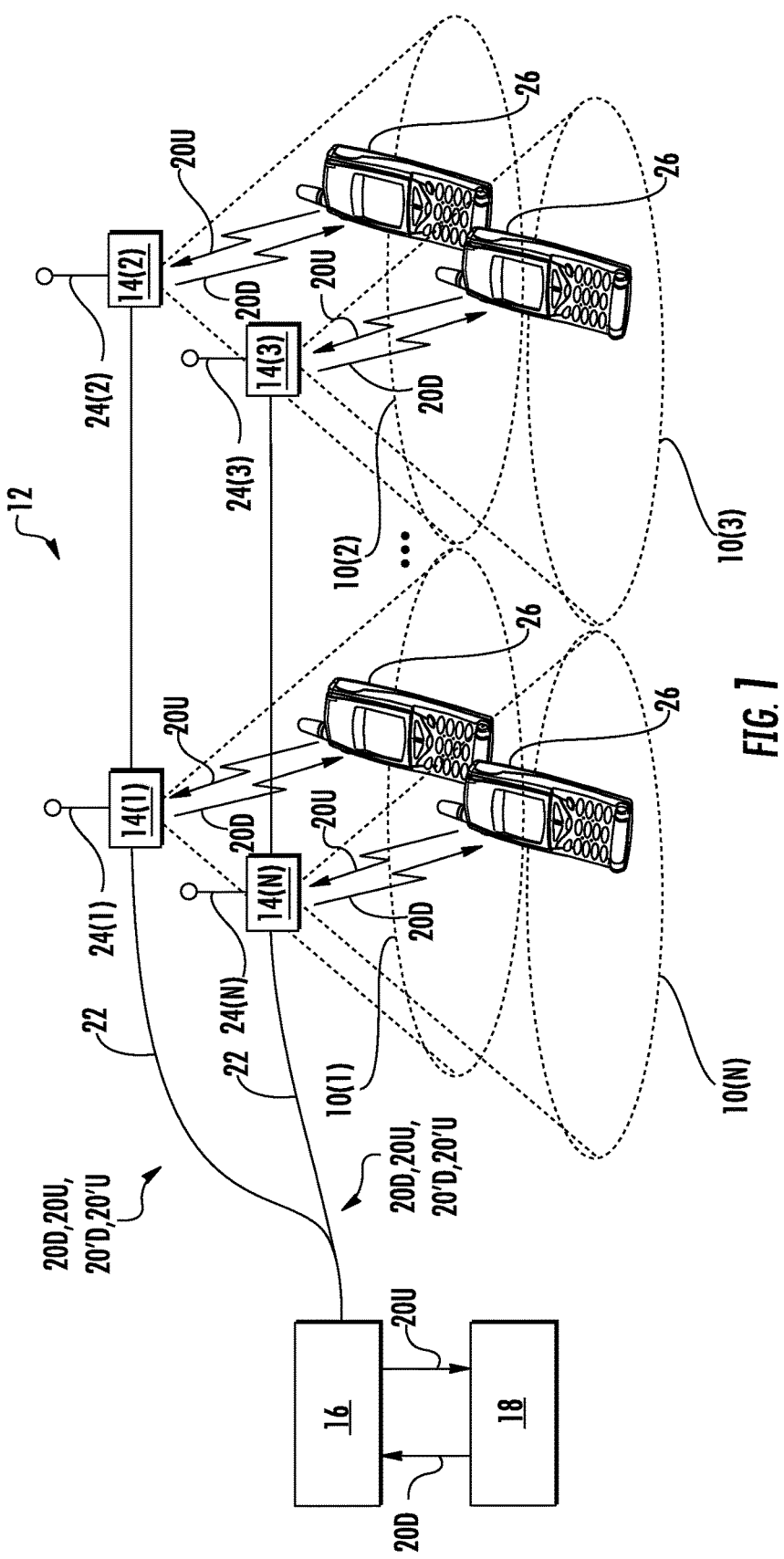
FIG. 1 is a schematic diagram of an exemplary distributed antenna system (DAS)
Figure 2:
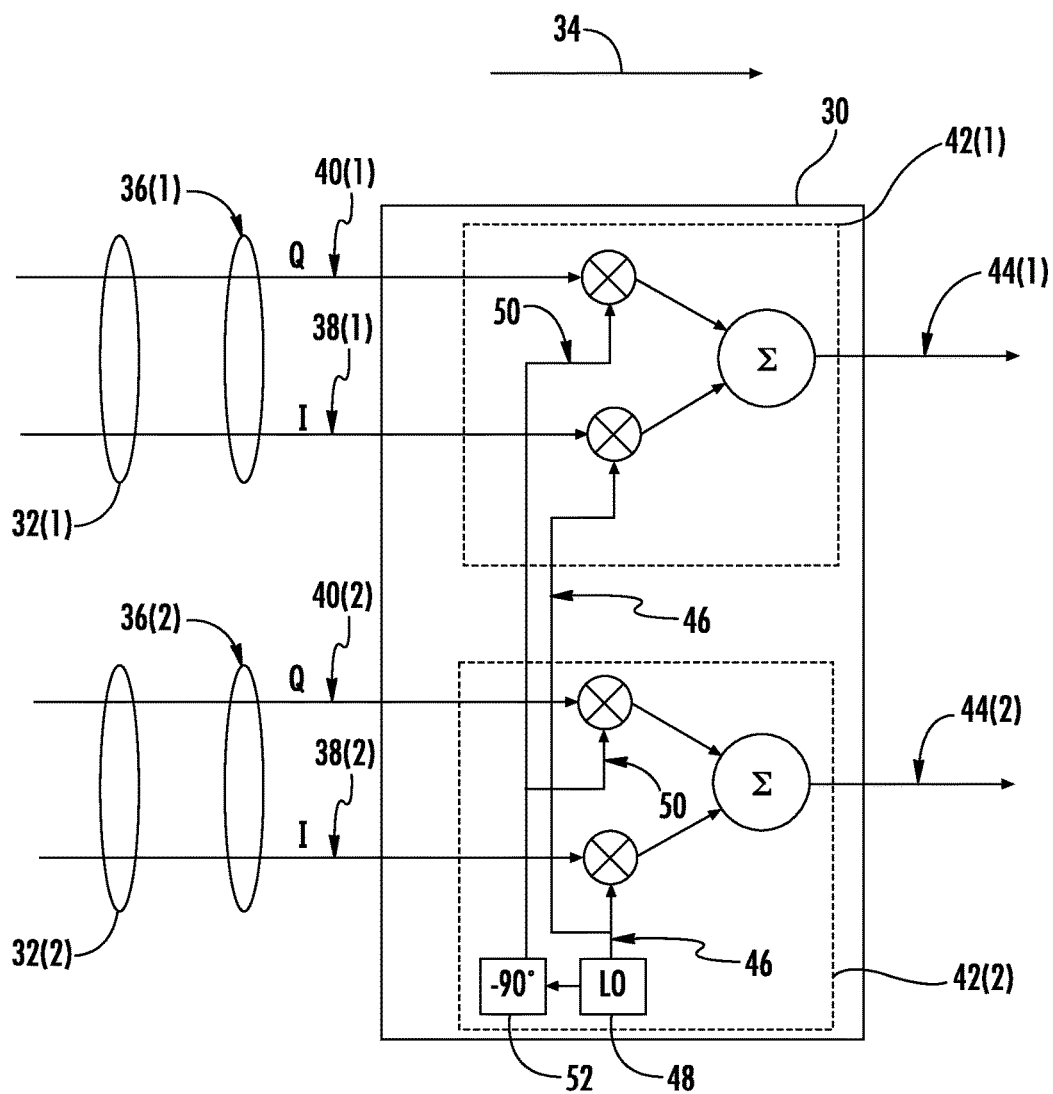
FIG. 2 is a schematic diagram of an exemplary commercially available multiple-input multiple-output (MIMO) baseband circuit that may be provided in remote antenna units (RAUs) to achieve higher data rates in the DAS of FIG. 1.
Figure 3:
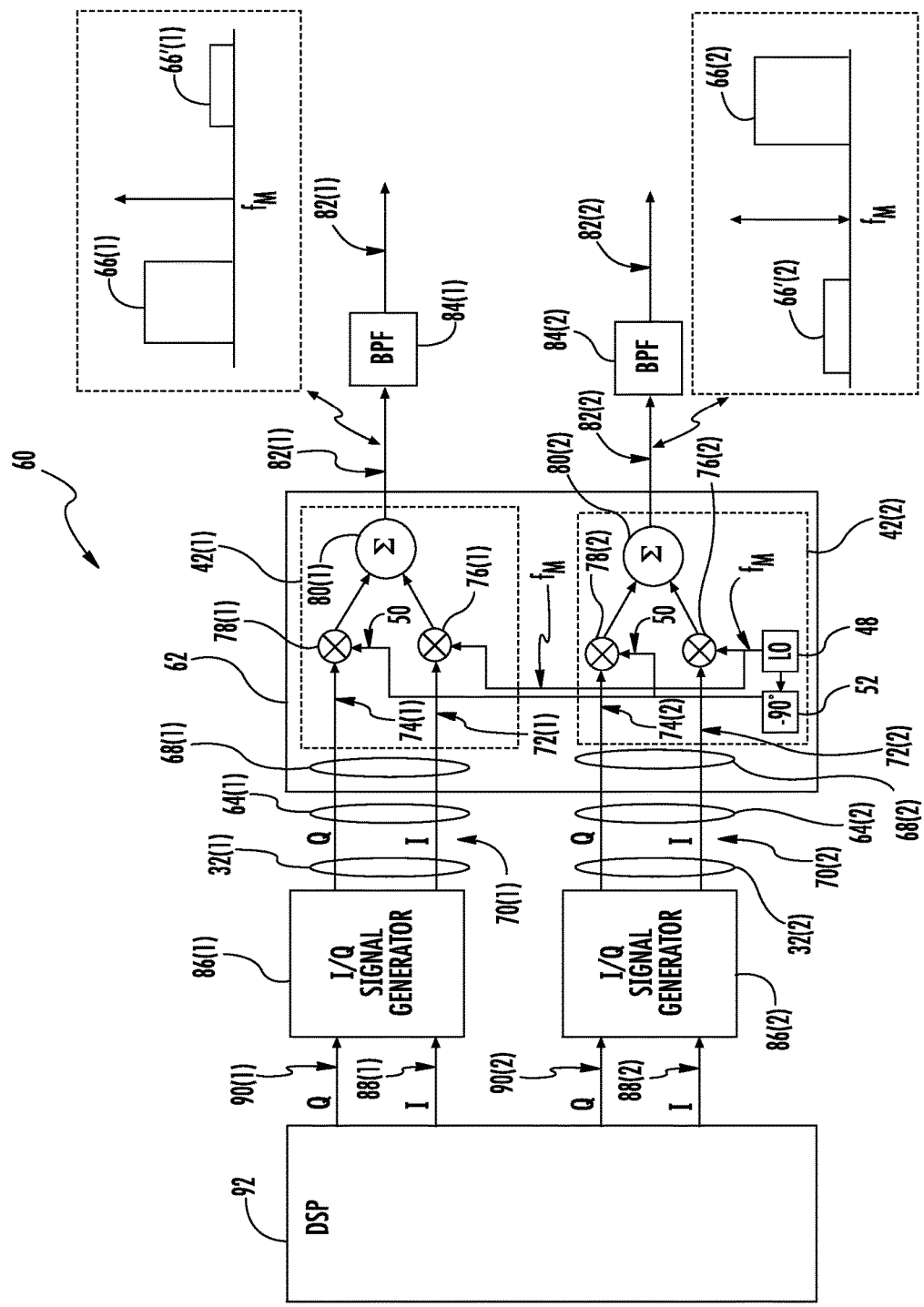
FIG. 3 is a schematic diagram of an exemplary adaptive MIMO communication system wherein a MIMO baseband circuit, such as the commercially available MIMO baseband circuit of FIG. 2, is reconfigured to support distinct downlink single-input single-output (SISO) services, thus allowing new wireless communication services and/or new radio frequency (RF) bands to be supported without replacing the MIMO baseband circuit.

Before discussing examples of supporting distinct SISO services in a MIMO baseband circuit starting at FIG. 3, a discussion of an exemplary DAS that employs a communications medium to support wireless communications services to a plurality of remote antenna units (RAUs) is first provided with reference to FIG. 1. An overview of an exemplary commercially available MIMO baseband circuit is then discussed with reference to FIG. 2. The discussion of specific exemplary aspects of supporting distinct SISO services in a MIMO baseband circuit starts at FIG. 3.

In this regard, FIG. 1 illustrates distribution of communications services to remote coverage areas 10(1)-10(N) of a DAS 12, wherein 'N' is the number of coverage areas. These communications services can include cellular services, wireless services such as radio frequency (RF) identification (RFID) tracking, Wireless Fidelity (Wi-Fi), local area network (LAN), WLAN, and combinations thereof, as examples. The remote coverage areas 10(1)-10(N) may be remotely located. In this regard, the remote coverage areas 10(1)-10(N) are created by and centered on RAUs 14(1)-14(N) connected to a head-end equipment (HEE) 16 (e.g., a head-end controller or head-end unit or central unit). The HEE 16 may be communicatively coupled to a signal source 18, for example a base transceiver station (BTS) or a baseband unit (BBU). In this regard, the HEE 16 receives downlink communications signals 20D from the signal source 18 to be distributed to the RAUs 14(1)-14(N). The RAUs 14(1)-14(N) are configured to receive the downlink communications signals 20D from the HEE 16 over a communications medium 22 to be distributed to the respective remote coverage areas 10(1)-10(N) of the RAUs 14(1)-14(N). In a non-limiting example, the communications medium 22 may be a wired communications medium, a wireless communications medium, or an optical fiber-based communications medium. In another non-limiting example, when the communications medium 22 is the optical fiber-based communications medium, the HEE 16 comprises an electrical-to-optical (E/O) converter (not shown) for converting the downlink communications signals 20D into downlink optical communications signals 20'D. Accordingly, the RAUs 14(1)-14(N) comprise optical-to-electrical (O/E) converters (not shown) to convert the downlink optical communications signals 20'D back to the downlink communications signals 20D. Each of the RAUs 14(1)-14(N) may include an RF transmitter/receiver (not shown) and a respective antenna 24(1)-24(N) operably connected to the RF transmitter/receiver to wirelessly distribute the communications services to client devices 26 within their respective remote coverage area 10(1)-10(N). The RAUs 14(1)-14(N) are also configured to receive uplink communications signals 20U from the client devices 26 in their respective remote coverage areas 10(1)-10(N) to be distributed to the signal source 18. In another non-limiting example, when the communications medium 22 is the optical fiber-based communications medium, the RAUs 14(1)-14(N) comprise E/O converters (not shown) to convert the uplink communications signals 20U to uplink optical communications signals 20'U. Accordingly, the HEE 16 comprises an O/E converter (not shown) for converting the uplink optical communications signals 20'U back into the uplink communications signals 20U. The size of a given remote coverage area 10(1)-10(N) is determined by the amount of RF power transmitted by the respective RAU 14(1)-14(N), the receiver sensitivity, antenna gain and the RF environment, as well as by the RF transmitter/receiver sensitivity of the client device 26. Client devices 26 usually have a fixed maximum RF receiver sensitivity, so that the above-mentioned properties of the RAUs 14(1)-14(N) mainly determine the size of their respective remote coverage areas 10(1)-10(N).

With reference to FIG. 1, the antennas 24(1)-24(N) may be MIMO antennas that are controlled by commercially available MIMO baseband circuits disposed in the RAUs 14(1)-14(N). In this regard, FIG. 2 is a schematic diagram of an exemplary commercially available MIMO baseband circuit 30 that may be provided in any of the RAUs 14(1)-14(N) to achieve higher data rates in the DAS 12 of FIG. 1.

The commercially available MIMO baseband circuit 30 comprises a first MIMO path 32(1) and a second MIMO path 32(2). In a downlink direction 34, the first MIMO path 32(1) and the second MIMO path 32(2) carry a first MIMO signal 36(1) and a second MIMO signal 36(2), respectively. Although the first MIMO signal 36(1) and the second MIMO signal 36(2) may not carry the same data, the first MIMO signal 36(1) and the second MIMO signal 36(2) must be associated with the same communication service (e.g., long-term evolution (LTE), wireless-fidelity (Wi-Fi), etc.) and configured to operate on the same RF band.

With continuing reference to FIG. 2, the first MIMO signal 36(1) comprises a first in-phase (I) signal 38(1) and a first quadrature (Q) signal 40(1). The second MIMO signal 36(2) comprises a second I signal 38(2) and a second Q signal 40(2). The first Q signal 40(1) is ninety-degree (90°) phase shifted from the first I signal 38(1). Likewise, the second Q signal 40(2) is 90° phase shifted from the second I signal 38(2). The commercially available MIMO baseband circuit 30 comprises a first quadrature modulator 42(1) and a second quadrature modulator 42(2). The first quadrature modulator 42(1) modulates the first I signal 38(1) and the first Q signal 40(1) to generate a first RF signal 44(1) based on a modulation frequency 46 received from an oscillator 48 and a phase-shift signal 50 received from a phase shifter 52. The second quadrature modulator 42(2) modulates the second I signal 38(2) and the second Q signal 40(2) to generate a second RF signal 44(2) based on the modulation frequency 46 received from the oscillator 48 and the phase-shift signal 50 received from the phase shifter 52.

In some DASs, such as the DAS 12 of FIG. 1 as an example, it may be desired to support new wireless communication services and/or new RF bands in the RAUs 14(1)-14(N) without incurring additional system update costs. As such, it may be desirable to reconfigure the commercially available MIMO baseband circuit 30 (FIG. 2) in the RAUs 14(1)-14(N) to support the new wireless communication services and/or the new RF bands. In this regard, FIG. 3 is a schematic diagram of an exemplary adaptive MIMO communication system 60 wherein an exemplary MIMO baseband circuit 62, such as the commercially available MIMO baseband circuit 30 in FIG. 2, is reconfigured to support distinct downlink SISO services. As will be described in more detail below, reconfiguring a MIMO baseband circuit, such as the MIMO baseband circuit 62 in FIG. 3, can allow new wireless communication services and/or new RF bands to be supported without replacing the MIMO baseband circuit 62. Common elements between FIGS. 2 and 3 are shown therein with common element numbers, and thus will not be re-described herein.

In this regard, with reference to FIG. 3, the MIMO baseband circuit 62 may be provided in an integrated circuit. The MIMO baseband circuit 62 includes the first MIMO path 32(1) and the second MIMO path 32(2). The first MIMO path 32(1) and the second MIMO path 32(2) are reconfigured to support a first SISO signal 64(1) and a second SISO signal 64(2), respectively, as opposed to, for example, supporting the first MIMO signal 36(1) and the second MIMO signal 36(2) shown in FIG. 2. The first SISO signal 64(1) and the second SISO signal 64(2) shown in FIG. 3 correspond to two different wireless services that are distributed on a first RF band 66(1) and a second RF band 66(2), respectively. In a non-limiting example, the wireless services may include long-term evolution (LTE) and cellular services such as global system for mobile communications (GSM). The first RF band 66(1) and the second RF band 66(2) are non-overlapping downlink RF bands. The first RF band 66(1) corresponds to a first lower frequency $f_{1L}$ (not shown), a first center frequency $f_1$ (not shown), a first upper frequency $f_{1H}$ (not shown), and a first bandwidth $W_1$ (not shown). The second RF band 66(2) corresponds to a second lower frequency $f_{2L}$ (not shown), a second center frequency $f_2$ (not shown), a second upper frequency $f_{2H}$ (not shown), and a second bandwidth $W_2$ (not shown). The first center frequency $f_1$ is less than the second center frequency $f_2$ ($f_1 < f_2$). In a non-limiting example, the first RF band 66(1) is between the $f_{1L}$ of seven hundred twenty-eight megahertz (728 MHz) and the $f_{1H}$ of seven hundred fifty-seven megahertz (757 MHz). Accordingly, the first center frequency $f_1$ of the first RF band 66(1) resides at seven hundred forty-two point five megahertz (742.5 MHz) and the first bandwidth $W_1$ is twenty-nine megahertz (29 MHz). In another non-limiting example, the second RF band 66(2) is between the $f_{2L}$ of eight hundred sixty-two megahertz (862 MHz) and the $f_{2H}$ of eight hundred ninety-four megahertz (894 MHz). Accordingly, the second center frequency $f_2$ of the second RF band 66(2) resides at eight hundred seventy-eight megahertz (878 MHz) and the second bandwidth $W_2$ is thirty-two megahertz (32 MHz).

With continuing reference to FIG. 3, the first quadrature modulator 42(1) comprises a first SISO signal input 68(1) that is coupled to the first MIMO path 32(1) to receive the first SISO signal 64(1). The first quadrature modulator 42(1) receives the first SISO signal 64(1) from the first SISO signal input 68(1) and modulates the first SISO signal 64(1) to the first RF band 66(1) based on a modulation frequency $f_M$ generated by the oscillator 48. Likewise, the second quadrature modulator 42(2) comprises a second SISO signal input 68(2) that is coupled to the second MIMO path 32(2) to receive the second SISO signal 64(2). The second quadrature modulator 42(2) receives the second SISO signal 64(2) from the second SISO signal input 68(2) and modulates the second SISO signal 64(2) from the second SISO signal input 68(2) to the second RF band 66(2) based on the modulation frequency $f_M$ generated by the oscillator 48. In this regard, the MIMO baseband circuit 62 is reconfigured to distribute the first SISO signal 64(1) and the second SISO signal 64(2) through the first MIMO path 32(1) and the second MIMO path 32(2), respectively.

With continuing reference to FIG. 3, the first SISO signal 64(1) and the second SISO signal 64(2) are received by the first SISO signal input 68(1) and the second SISO signal input 68(2) on a first intermediate frequency (IF) band 70(1) and a second IF band 70(2), respectively. The first IF band 70(1) corresponds to a first IF lower frequency $f_{IF1L}$ (not shown), a first IF center frequency $f_{IF1}$ (not shown), a first IF upper frequency $f_{IF1H}$ (not shown), and a first IF bandwidth $W_{IF1}$ (not shown). In a non-limiting example, the first IF band 70(1) ranges from the $f_{IF1L}$ of negative eighty-one point five megahertz (−81.5 MHz) to the $f_{IF1H}$ of negative fifty-two point five megahertz (−52.5 MHz). Accordingly, the first IF center frequency $f_{IF1}$ resides at negative sixty-seven megahertz (−67 MHz) and the first IF bandwidth $W_{IF1}$ is twenty-nine megahertz (29 MHz), which is equal to the first bandwidth $W_1$ of the first RF band 66(1). The second IF band 70(2) corresponds to a second IF lower frequency $f_{IF2L}$ (not shown), a second IF center frequency $f_{IF2}$ (not shown), a second IF upper frequency $f_{IF2H}$ (not shown), and a second IF bandwidth $W_{IF2}$ (not shown). In a non-limiting example, the second IF band 70(2) ranges from the $f_{IF2L}$ of fifty-two point five megahertz (52.5 MHz) to the $f_{IF2H}$ of eighty-four point five megahertz (84.5 MHz). Accordingly, the second IF center frequency $f_{IF2}$ resides at sixty-eight point five megahertz (68.5 MHz) and the second IF bandwidth $W_{IF2}$ is thirty-two megahertz (32 MHz), which is equal to the second bandwidth $W_2$ of the second RF band 66(2). As is further discussed later in reference to FIG. 5, the modulation frequency $f_M$, the first center frequency $f_1$, the second center frequency $f_2$, the first IF center frequency $f_{IF1}$, and the second IF center frequency $f_{IF2}$ are coordinated to support the first SISO signal 64(1) and the second SISO signal 64(2) in the MIMO baseband circuit 62.

With continuing reference to FIG. 3, the first SISO signal 64(1) comprises a first I signal 72(1) and a first Q signal 74(1), which is ninety degree (90°) phase shifted from the first I signal 72(1). The first quadrature modulator 42(1) comprises a first I modulator 76(1), a first Q modulator 78(1), and a first combiner 80(1). The first I signal 72(1) and the first Q signal 74(1) are first modulated by the first I modulator 76(1) and the first Q modulator 78(1), respectively, and then combined by the first combiner 80(1) to generate a first RF signal 82(1). The first RF signal 82(1) is modulated by the first quadrature modulator 42(1) to the first RF band 66(1) and a mirrored first RF band 66'(1). A first filter 84(1) is therefore provided to pass the first RF signal 82(1) in the first RF band 66(1) and eliminate the first RF signal 82(1) in the mirrored first RF band 66'(1).

With continuing reference to FIG. 3, the second SISO signal 64(2) comprises a second I signal 72(2) and a second Q signal 74(2), which is 90° phase shifted from the second I signal 72(2). The second quadrature modulator 42(2) comprises a second I modulator 76(2), a second Q modulator 78(2), and a second combiner 80(2). The second I signal 72(2) and the second Q signal 74(2) are first modulated by the second I modulator 76(2) and the second Q modulator 78(2), respectively, and then combined by the second combiner 80(2) to generate a second RF signal 82(2). The second RF signal 82(2) is modulated by the second quadrature modulator 42(2) to the second RF band 66(2) and a mirrored second RF band 66'(2). A second filter 84(2) is therefore provided to pass the second RF signal 82(2) in the second RF band 66(2) and eliminate the second RF signal 82(2) in the mirrored second RF band 66'(2).

With continuing reference to FIG. 3, the first I signal 72(1) and the first Q signal 74(1) are provided by a first I/Q signal generator 86(1). The first I/Q signal generator 86(1) generates the first I signal 72(1) and the first Q signal 74(1) based on a first digital I signal 88(1) and a first digital Q signal 90(1), respectively. The first digital I signal 88(1) and the first digital Q signal 90(1) are provided by a digital signal processor (DSP) 92. In a non-limiting example, the first digital I signal 88(1) and the first digital Q signal 90(1) conform to the common public radio interface (CPRI) format. The second I signal 72(2) and the second Q signal 74(2) are provided by a second I/Q signal generator 86(2). The second I/Q signal generator 86(2) generates the second I signal 72(2) and the second Q signal 74(2) based on a second digital I signal 88(2) and a second digital Q signal 90(2), respectively. The second digital I signal 88(2) and the second digital Q signal 90(2) are also provided by the DSP 92. In a non-limiting example, the second digital I signal 88(2) and the second digital Q signal 90(2) conform to the CPRI format.

Figure 4:
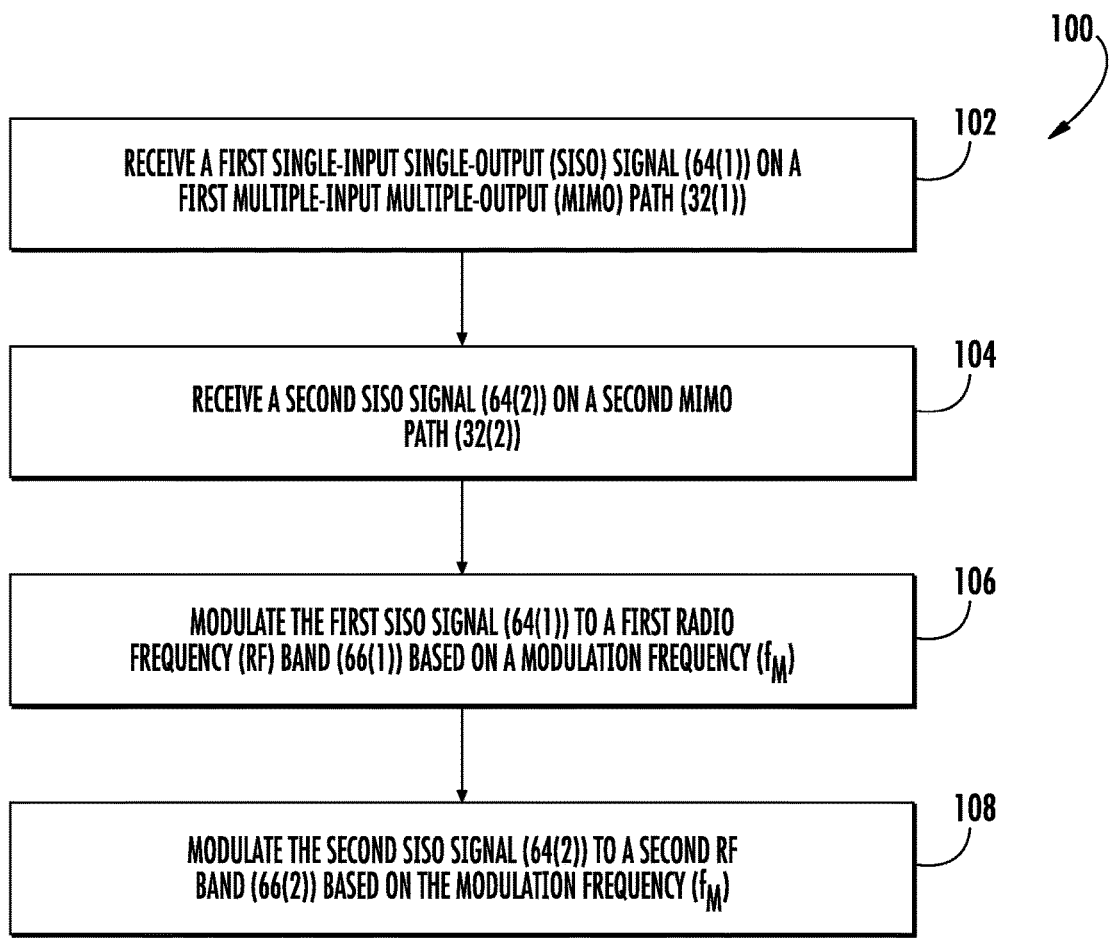
FIG. 4 is a flowchart of an exemplary adaptive communication process for reconfiguring the MIMO baseband circuit of FIG. 3 to support the distinct SISO services.

To further explain an example of supporting distinct SISO services in the MIMO baseband circuit 62 in FIG. 3, FIG. 4 is provided. FIG. 4 is a flowchart of an exemplary adaptive communication process 100 for reconfiguring the MIMO baseband circuit 62 of FIG. 3 to support distinct downlink SISO services.

In this regard, according to the adaptive communication process 100 in FIG. 4, the MIMO baseband circuit 62 receives the first SISO signal 64(1) on the first MIMO path 32(1) (block 102). The MIMO baseband circuit 62 also receives the second SISO signal 64(2) on the second MIMO path 32(2) (block 104). As previously discussed in FIG. 3, the first SISO signal 64(1) and the second SISO signal 64(2) correspond to two different wireless services. Further according to discussions in FIG. 3, the first RF band 66(1) and the second RF band 66(2) are non-overlapping RF bands. In this regard, the MIMO baseband circuit 62 modulates the first SISO signal 64(1) to the first RF band 66(1) based on the modulation frequency $f_M$ (block 106). Likewise, the MIMO baseband circuit 62 modulates the second SISO signal 64(2) to the second RF band 66(2) based on the modulation frequency $f_M$ (block 108).

Figure 5:
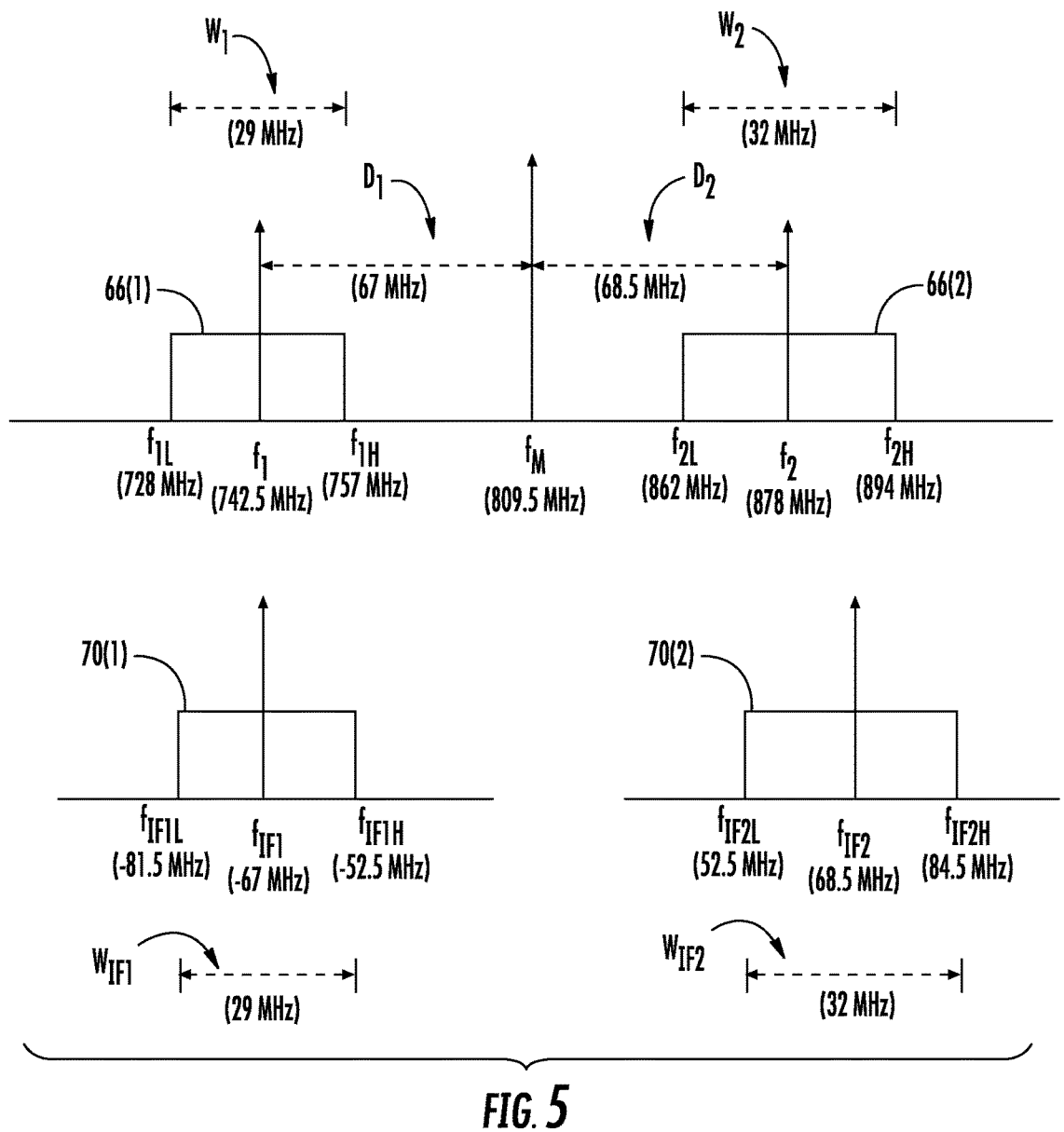
FIG. 5 is a schematic diagram illustrating a coordination between a modulation frequency $f_M$, a first center frequency $f_1$, a downlink center frequency $f_2$, a first intermediate frequency (IF) center frequency $f_{IF1}$, and a second IF center frequency $f_{IF2}$ to support the distinct downlink SISO services in the MIMO baseband circuit of FIG. 3.

As previously mentioned in FIG. 3, the modulation frequency $f_M$, the first center frequency $f_1$, the second center frequency $f_2$, the first IF center frequency $f_{IF1}$, and the second IF center frequency $f_{IF2}$ must be coordinated to support the first SISO signal 64(1) and the second SISO signal 64(2) in the MIMO baseband circuit 62. In this regard, FIG. 5 is a schematic diagram illustrating a coordination between the modulation frequency $f_M$, the first center frequency $f_1$, the second center frequency $f_2$, the first IF center frequency $f_{IF1}$, and the second IF center frequency $f_{IF2}$ to support the distinct SISO services in the MIMO baseband circuit 62 of FIG. 3. Elements of FIG. 3 are referenced in connection with FIG. 5 and will not be re-described herein.

With reference to FIG. 5, the modulation frequency $f_M$ is configured to reside between the first center frequency $f_1$ and the second center frequency $f_2$. In a non-limiting example, if the first bandwidth $W_1$ equals to the second bandwidth $W_2$, the modulation frequency $f_M$ resides in the middle of the first center frequency $f_1$ and the second center frequency $f_2$. In this regard, the modulation frequency $f_M$ may be computed based on the equation (Eq. 1) below:

$$f_M = (f_1 + f_2)/2 \qquad\qquad (\text{Eq. 1})$$

However, if the first bandwidth $W_1$ does not equal to the second bandwidth $W_2$, the modulation frequency $f_M$ may be chosen by taking into consideration of the bandwidth differences. In this regard, the modulation frequency $f_M$ may be calculated based on the equation (Eq. 2) below:

$$f_M = (f_1+f_2)/2 + (W_1-W_2)/4 (f_1 < f_2) \quad \text{(Eq. 2)}$$

According to the non-limiting example referenced in FIG. 3, the first center frequency $f_1$ is 742.5 MHz and the first bandwidth $W_1$ is 29 MHz. The second center frequency $f_2$ is 878 MHz and the second bandwidth $W_2$ is 32 MHz. Because $W_1$ does not equal to $W_2$, the modulation frequency $f_M$ equals 809.5 MHz according to Eq. 2.

With continuing reference to FIG. 5, the first IF center frequency $f_{IF1}$ depends a first distance $D_1$ from the modulation frequency $f_M$ to the first center frequency $f_1$ ($f_{IF1}=D_1=f_M-f_1$). Similarly, the second IF center frequency $f_{IF2}$ depends on a second distance $D_2$ from the modulation frequency $f_M$ to the second center frequency $f_2$ ($f_{IF2}=D_2=f_M-f_2$). Again, according to the non-limiting example referenced in FIG. 3, the first IF center frequency $f_{IF1}$ and the second IF center frequency $f_{IF2}$ reside at 67 MHz and 68.5 MHz, respectively. In addition, the first IF bandwidth $W_{IF1}$ and the second IF bandwidth $W_{IF2}$ are set to be equal to the first bandwidth $W_1$ of the first RF band 66(1) and the second bandwidth $W_2$ of the second RF band 66(2), respectively. Hence, by coordinating the modulation frequency $f_M$, the first center frequency $f_1$, the second center frequency $f_2$, the first IF center frequency $f_{IF1}$, and the second IF center frequency $f_{IF2}$ as described above, the first SISO signal 64(1) and the second SISO signal 64(2) can be modulated correctly to the first RF band 66(1) and the second RF band 66(2), respectively.

With reference back to FIG. 3, in a non-limiting example, the first I/Q signal generator 86(1) and the second I/Q signal generator 86(2) may be enabled by a zero-IF modulator, a complex-IF modulator, or combination of both. In this regard, an overview of the zero-IF modulator and the complex-IF modulator are provided in FIGS. 6A and 6B, respectively. Common elements between FIGS. 3, 6A, and 6B are shown therein with common element numbers, and thus will not be re-described herein.

Figure 6A:
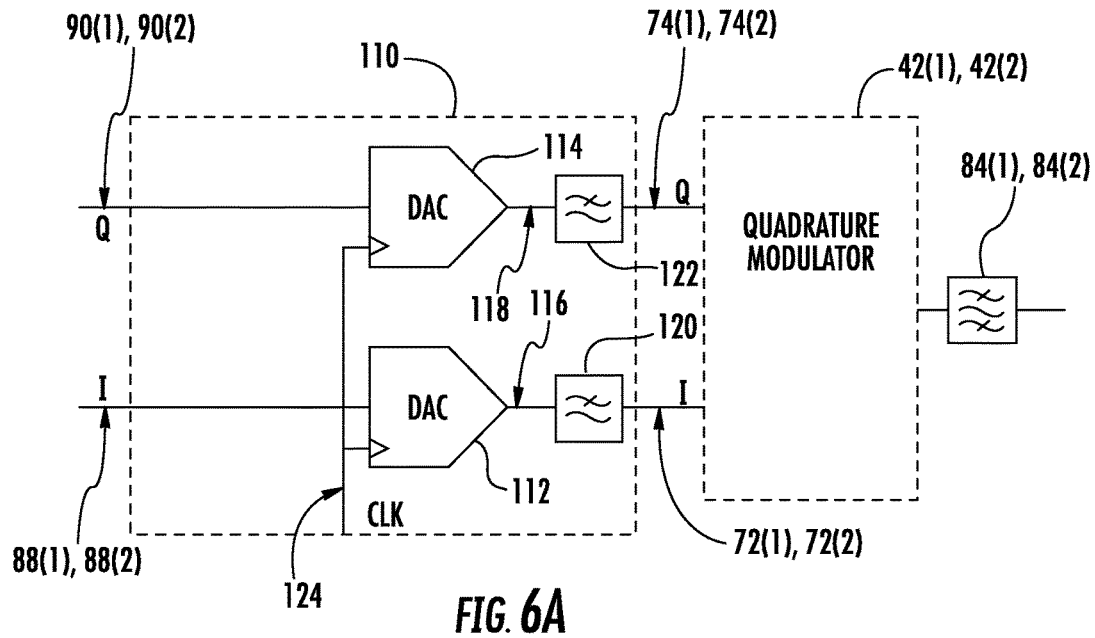
FIG. 6A is a schematic diagram of an exemplary zero-IF modulator that may be provided as a first in-phase/out-phase (I/Q) signal generator and/or a second I/Q signal generator in the adaptive MIMO communication system of FIG. 3.

FIG. 6A is a schematic diagram of an exemplary zero-IF modulator 110 that may be provided as the first I/Q signal generator 86(1) and/or the second I/Q signal generator 86(2) of FIG. 3 in the adaptive MIMO communication system 60. The zero-IF modulator 110 comprises a first digital-to-analog converter (DAC) 112 and a second DAC 114. The first DAC 112 converts the first digital I signal 88(1) or the second digital I signal 88(2) to generate an analog I signal 116. The second DAC 114 converts the first digital Q signal 90(1) or the second digital Q signal 90(2) to generate an analog Q signal 118. A first low-pass filter 120 is configured to pass a wanted portion of the analog I signal 116 to generate the first I signal 72(1) or the second I signal 72(2). A second low-pass filter 122 is configured to pass a wanted portion of the analog Q signal 118 to generate the first Q signal 74(1) or the second Q signal 74(2). Both the first DAC 112 and the second DAC 114 are controlled by a clock signal 124.

Figure 6B:
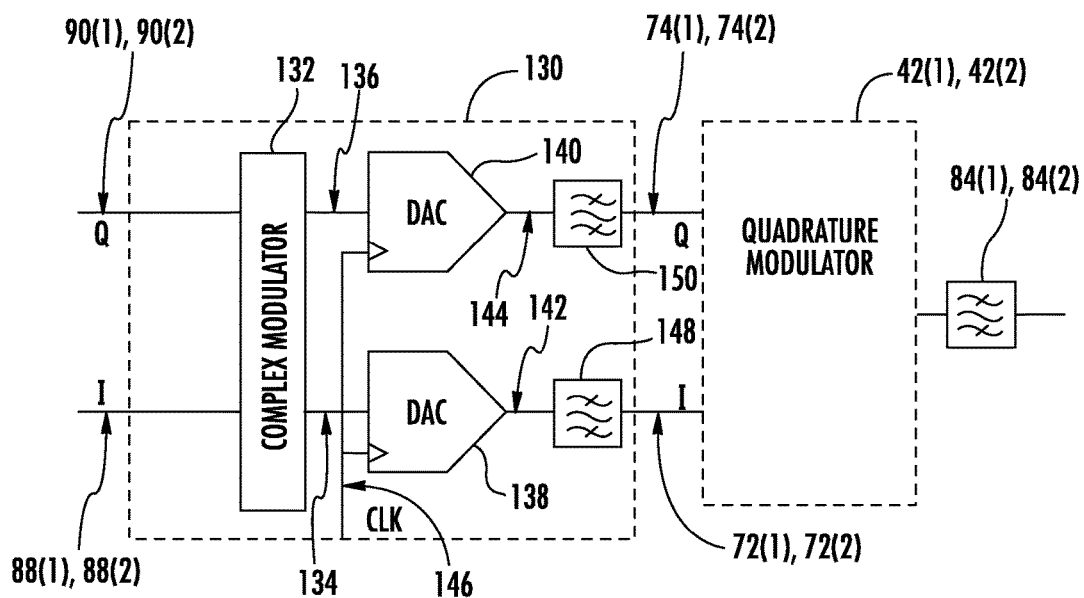
FIG. 6B is a schematic diagram of an exemplary complex-IF modulator that may be provided as a first IF modulator and/or a second IF modulator in the adaptive MIMO communication system of FIG. 3.

FIG. 6B is a schematic diagram of an exemplary complex-IF modulator 130 that may be provided as the first I/Q signal generator 86(1) and/or the second I/Q signal generator 86(2) in the adaptive MIMO communication system 60 of FIG. 3. The complex-IF modulator 130 comprises a complex modulator 132. The complex modulator 132 converts the first digital I signal 88(1) or the second digital I signal 988(2) to generate a complex digital I signal 134. The complex modulator 132 also converts the first digital Q signal 90(1) or the second digital Q signal 90(2) to generate a complex digital Q signal 136. A first DAC 138 and a second DAC 140 convert the complex digital I signal 134 and the complex digital Q signal 136 to generate a complex analog I signal 142 and a complex analog Q signal 144, respectively, based on a clock signal 146. A first band-pass filter 148 is configured to pass a wanted portion of the complex analog I signal 142 to generate the first I signal 72(1) or the second I signal 72(2). A second band-pass filter 150 is configured to pass a wanted portion of the complex analog Q signal 144 to generate the first Q signal 74(1) or the second Q signal 74(2).

As previously discussed in FIG. 5, the modulation frequency $f_M$ is configured to reside between the first center frequency $f_1$ and the second center frequency $f_2$. However, it may also be possible to configure the modulation frequency $f_M$ to be lower than the first center frequency $f_1$ or higher than the second center frequency $f_2$. Aspects related to configuring the modulation frequency $f_M$ to reside outside the first center frequency $f_1$ and the second center frequency $f_2$ are discussed next in reference to FIGS. 7A and 7B.

Figure 7A:
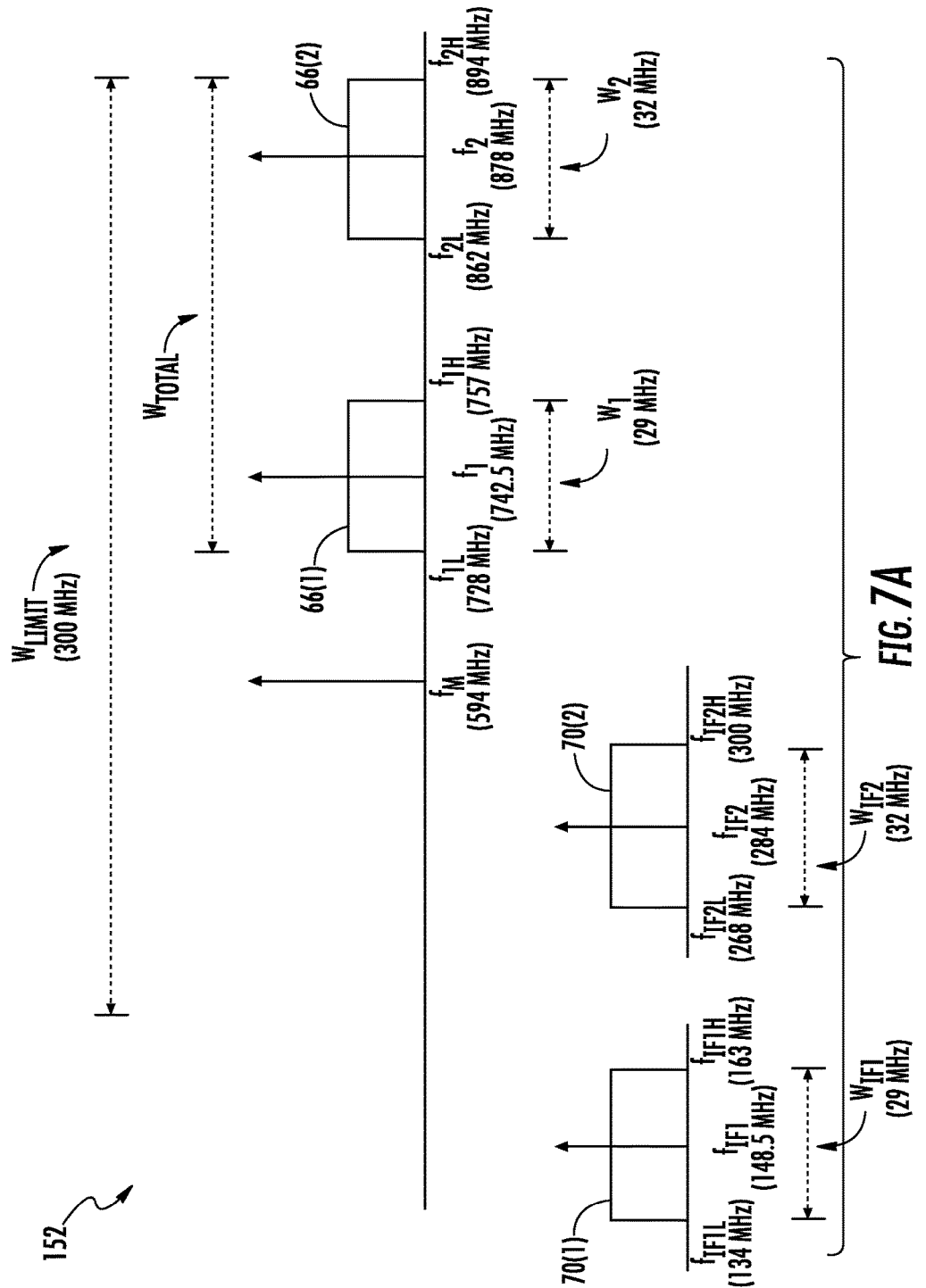
FIG. 7A is a schematic diagram of an exemplary modulation frequency configuration in which the modulation frequency $f_M$ of FIG. 5 is configured to be lower than the first center frequency $f_1$.

In this regard, FIG. 7A is a schematic diagram of an exemplary modulation frequency configuration 152 in which the modulation frequency $f_M$ of FIG. 5 is configured to be lower than the first center frequency $f_1$. Common elements between FIGS. 3, 5, and 7A are shown therein with common element numbers, and thus will not be re-described herein. With reference to FIG. 7A, the modulation frequency configuration 152 is based on two primary configuration parameters. A first configuration parameter is a modulation bandwidth limit $W_{I\text{-}BHT}$ that a maximum bandwidth of the first quadrature modulator 42(1) (not shown) and the second quadrature modulator 42(2) (not shown) can support. A second configuration parameter is a total RF bandwidth of the first RF band 66(1) and the second RF band 66(2) WTOTAL, which must be less than or equal to the $W_{LIMIT}$ ($W_{TOTAL} \leq W_{LIMIT}$) and may be determined based on the equation (Eq. 3) below.

$$W_{TOTAL} = f_{2H} - f_{1L} \quad \text{(Eq. 3)}$$

Based on the $W_{LIMIT}$ and the $W_{TOTAL}$, the $f_{IF1}$, $f_{IF1H}$, $f_{IF2L}$, $f_{IF2H}$, and $f_M$ may be determined based on the equations (Eqs. 4.1-4.5) below.

$$f_{IF1L} \leq W_{LIMIT} - W_{TOTAL} \quad \text{(Eq. 4.1)}$$

$$f_{IF1H} = f_{IF1L} + W_1 \quad \text{(Eq. 4.2)}$$

$$f_{IF2L} = f_{IF1H} + f_{2L} - f_{1H} \quad \text{(Eq. 4.3)}$$

$$f_{IF2H} = f_{IF2L} + W_2 \quad \text{(Eq. 4.4)}$$

$$f_M = f_2 - f_{IF2} \quad \text{(Eq. 4.5)}$$

In this regard, according to the non-limiting examples described in FIGS. 3 and 5, the $W_{TOTAL}$ equals one hundred sixty-six megahertz (166 MHz) according to Eq. 3. Assuming that the $W_{LIMIT}$ equals three hundred megahertz (300 MHz) and the $f_{IF1L}$ equals $W_{LIMIT}-W_{TOTAL}$ in Eq. 4.1, the $f_{IF1L}$, $f_{IF1H}$, $f_{IF2L}$, $f_{IF2H}$, and $f_M$ may be determined to be one hundred thirty-four megahertz (134 MHz), one hundred sixty-three megahertz (163 MHz), two hundred sixty-eight megahertz (268 MHz), three hundred megahertz (300 MHz), and five hundred ninety-four megahertz (594 MHz), respectively. Accordingly, the $f_{IF1}$ ($=(f_{IF1L}+f_{IF1H})/2$) and the $f_{IF2}$ ($=(f_{IF2L}+f_{IF2H})/2$) are one hundred forty-eight point five megahertz (148.5 MHz) and two hundred eighty-four megahertz (284 MHz), respectively. Hence, the $f_M$ is lower than the $f_1$.

Figure 7B:
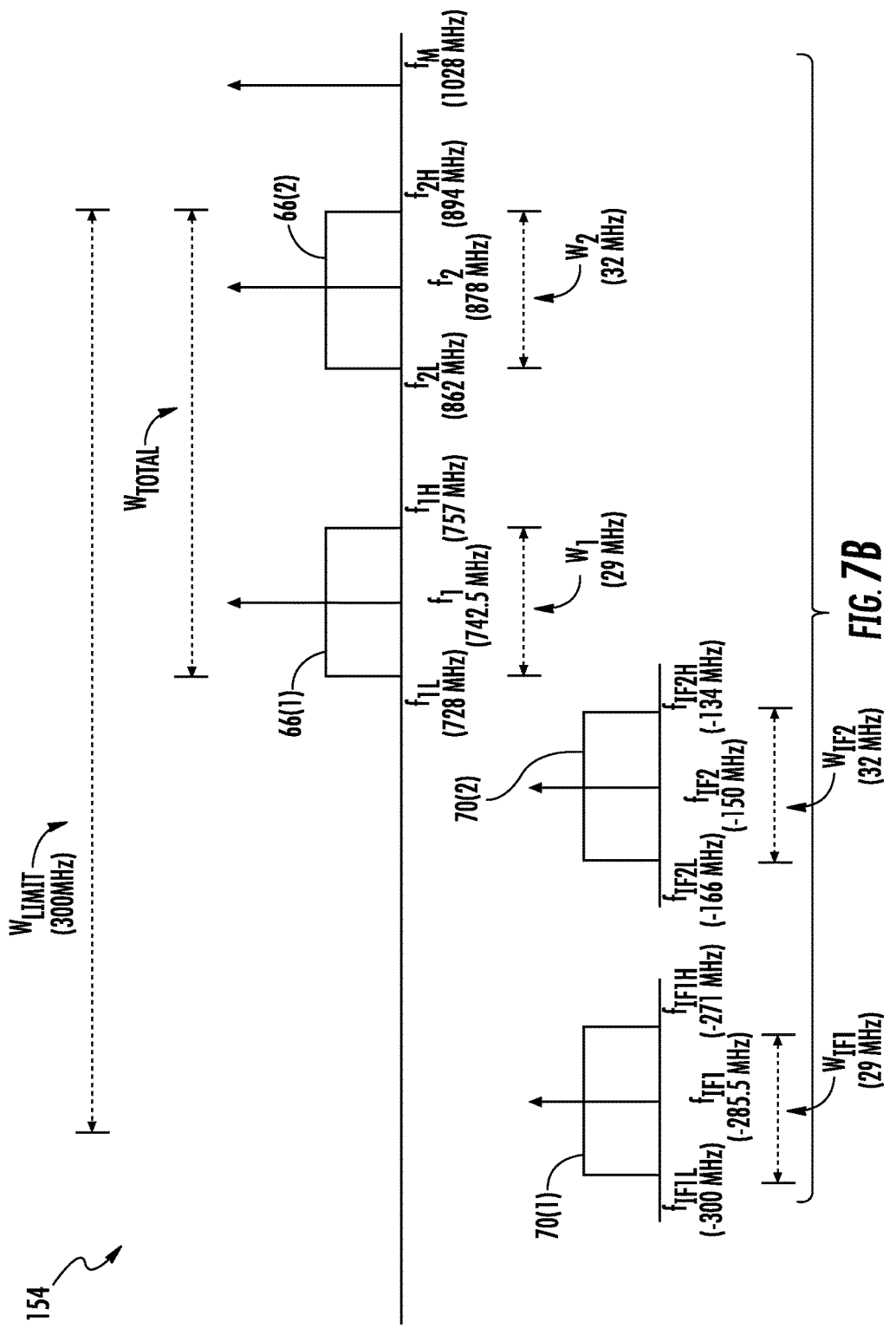
FIG. 7B is a schematic diagram of an exemplary modulation frequency configuration in which the modulation frequency $f_M$ of FIG. 5 is configured to be higher than the second center frequency $f_2$.

FIG. 7B is a schematic diagram of an exemplary modulation frequency configuration 154 in which the modulation frequency $f_M$ of FIG. 5 is configured to be higher than the second center frequency $f_2$. Common elements between FIGS. 3, 5, 7A, and 7B are shown therein with common element numbers, and thus will not be re-described herein.

With reference to FIG. 7B, assuming that the $W_{LIMIT}$ equals to negative three hundred megahertz (−300 MHz), the $f_{IF1L}$, as determined based on the equation (Eq. 5) below, equals to −300 MHz.

$$f_{IF1L} = W_{LIMIT} \quad \text{(Eq. 5)}$$

Accordingly, based on Eqs. 4.2-4.5 above, the $f_{IF1H}$, $f_{IF2L}$, $f_{IF2H}$, and $f_M$ may be determined to be negative two hundred seventy-on megahertz (−271 MHz), negative one hundred sixty-six megahertz (−166 MHz), negative one hundred thirty-four megahertz (−134 MHz), and one thousand twenty-eight megahertz (1028 MHz), respectively. Accordingly, the $f_{IF1}$ and the $f_{IF2}$ are negative two hundred eighty-five point five megahertz (−285.5 MHz) and negative one hundred fifty megahertz (−150 MHz), respectively. Hence, the $f_M$ is higher than the $f_2$.

In a non-limiting example, by configuring the modulation frequency $f_M$ to be lower than the first center frequency $f_1$ or higher than the second center frequency $f_2$, it may be possible to eliminate one of the first filter 84(1) and the second filter 84(2), thus reducing overall costs of the adaptive MIMO communication system 60. In addition, it may also provide increased flexibility in designing and implementing the adaptive MIMO communication system 60.

Figure 8:
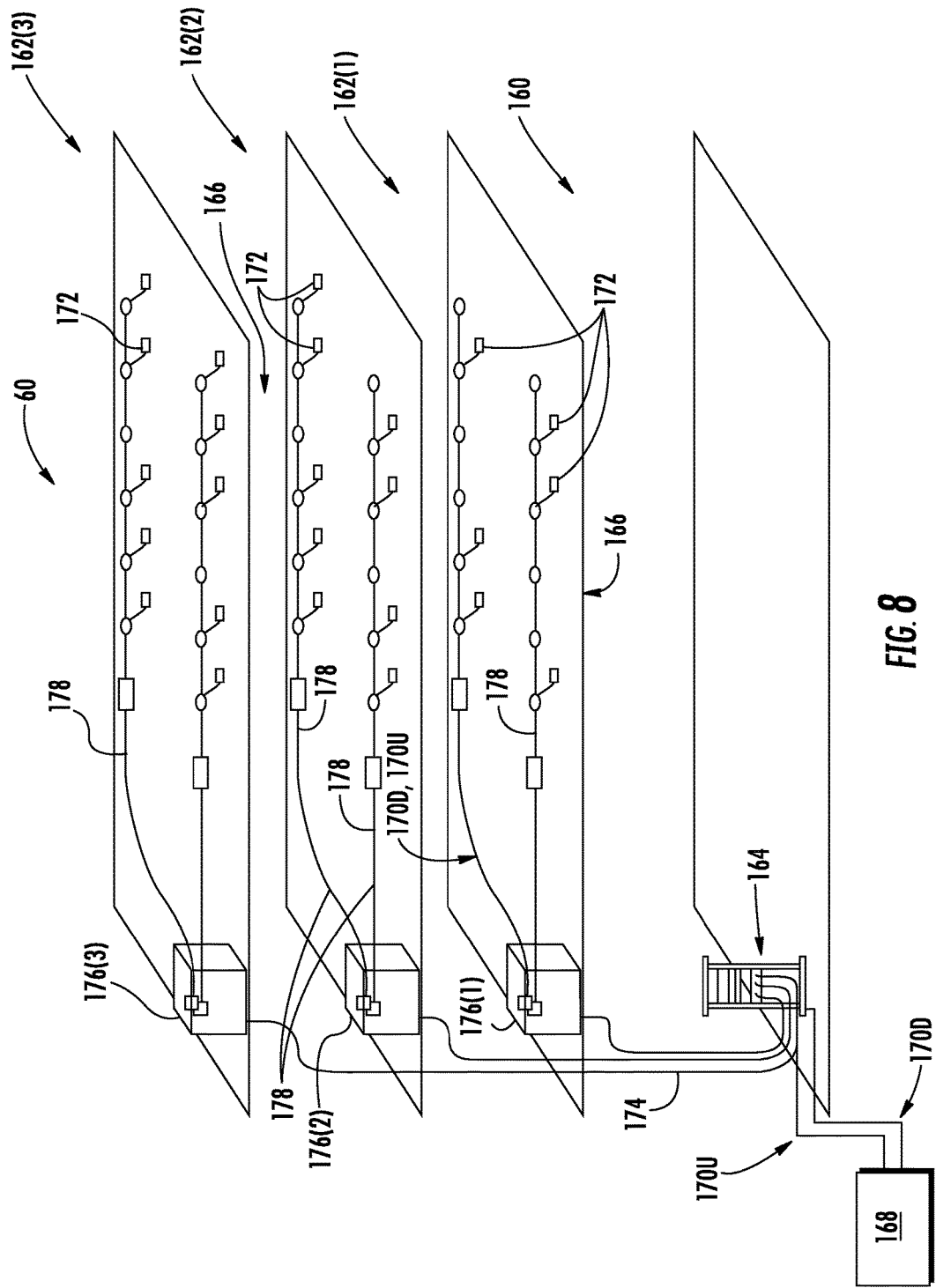
FIG. 8 is a partially schematic cut-away diagram of an exemplary building infrastructure in which the adaptive MIMO communication system of FIG. 3 can be employed.

The adaptive MIMO communication system 60 of FIG. 3 may be provided in an indoor environment, as illustrated in FIG. 8. FIG. 8 is a partially schematic cut-away diagram of an exemplary building infrastructure 160 in which the adaptive MIMO communication system 60 of FIG. 3 can be employed. The building infrastructure 160 in this embodiment includes a first (ground) floor 162(1), a second floor 162(2), and a third floor 162(3). The floors 162(1)-162(3) are serviced by a central unit 164 to provide antenna coverage areas 166 in the building infrastructure 160. The central unit 164 is communicatively coupled to a base station 168 to receive downlink communications signals 170D from the base station 168. The central unit 164 is communicatively coupled to a plurality of RAUs 172 to distribute the downlink communications signals 170D to the plurality of RAUs 172 and to receive uplink communications signals 170U from the plurality of RAUs 172, as previously discussed above. In this regard, the adaptive MIMO communication system 60 may be provided in at least one RAU among the plurality of RAUs 172. The downlink and uplink communications signals 170D, 170U communicated between the central unit 164 and the plurality of RAUs 172 are carried over a riser cable 174. The riser cable 174 may be routed through interconnect units (ICUs) 176(1)-176(3) dedicated to each of the floors 162(1)-162(3) that route the downlink and uplink communications signals 170D, 170U to the RAUs 172 and also provide power to the RAUs 172 via array cables 178.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A multiple-input multiple-output (MIMO) baseband circuit configured to support distinct single-input single-output (SISO) services, comprising:
   a first MIMO path configured to distribute a first SISO signal;
   a second MIMO path configured to distribute a second SISO signal;
   a first quadrature modulator comprising a first SISO signal input coupled to the first MIMO path, the first SISO signal input configured to receive the first SISO signal; and
   a second quadrature modulator comprising a second SISO signal input coupled to the second MIMO path, the second SISO signal input configured to receive the second SISO signal;
   wherein:
      the first quadrature modulator is configured to modulate the first SISO signal to a first radio frequency (RF) band based on a modulation frequency;
      the second quadrature modulator is configured to modulate the second SISO signal to a second RF band that is different from the first RF band based on the modulation frequency;
      the first RF band comprises a first center frequency and a first bandwidth;
      the second RF band comprises a second center frequency and a second bandwidth; and
      the modulation frequency resides between the first center frequency of the first RF band and the second center frequency of the second RF band.

2. The MIMO baseband circuit of claim 1, wherein the modulation frequency resides in the middle of the first center frequency of the first RF band and the second center frequency of the second RF band.

3. The MIMO baseband circuit of claim 1, wherein:
   the first SISO signal is received by the first SISO signal input on a first intermediate frequency (IF) band;
   the second SISO signal are received by the second SISO signal input on a second IF band;
   the first IF band comprises a first IF center frequency and a first IF bandwidth,
   wherein:
      the first IF center frequency is determined by subtracting the modulation frequency from the first center frequency; and
      the first IF bandwidth is equal to the first bandwidth of the first RF band; and
   the second IF band comprises a second IF center frequency and a second IF bandwidth, wherein:
      the second IF center frequency is determined by subtracting the modulation frequency from the second center frequency; and
      the second IF bandwidth is equal to the second bandwidth of the second RF band.

4. The MIMO baseband circuit of claim 1, wherein the modulation frequency is lower than the first center frequency of the first RF band.

5. The MIMO baseband circuit of claim 1, wherein the modulation frequency is higher than the second center frequency of the second RF band.

6. The MIMO baseband circuit of claim 1, wherein:
the first SISO signal comprises a first in-phase (I) signal and a first quadrature (Q) signal; and
the second SISO signal comprises a second I signal and a second Q signal.

7. The MIMO baseband circuit of claim 6, wherein:
the first quadrature modulator is further configured to modulate the first I signal and the first Q signal to generate a first RF signal for communicating on the first RF band; and
the second quadrature modulator is further configured to modulate the second I signal and the second Q signal to generate a second RF signal for communicating on the second RF band.

8. A method for support distinct single-input signal-output (SISO) services in a multiple-input multiple-output (MIMO) baseband circuit, comprising:
receiving a first SISO signal on a first MIMO path;
receiving a second SISO signal on a second MIMO path;
modulating the first SISO signal to a first radio frequency (RF) band based on a modulation frequency;
modulating the second SISO signal to a second RF band that is different from the first RF band based on the modulation frequency;
determining a first center frequency and a first bandwidth of the first RF band;
determining a second center frequency and a second bandwidth of the second RF band; and
determining the modulation frequency based on the first center frequency and the second center frequency, wherein the modulation frequency resides between the first center frequency and the second center frequency.

9. The method of claim 8, further comprising determining the modulation frequency by averaging the first center frequency and the second center frequency.

10. The method of claim 9, further comprising:
receiving the first SISO signal on a first intermediate frequency (IF) band, wherein the first IF band comprises a first IF center frequency and a first IF bandwidth;
receiving the second SISO signal on a second IF band, wherein the second IF band comprises a second IF center frequency and a second IF bandwidth.

11. The method of claim 10, further comprising:
determining the first IF center frequency by subtracting the modulation frequency from the first center frequency;
determining the first IF bandwidth as being equal to the first bandwidth;
determining the second IF center frequency by subtracting the modulation frequency from the second center frequency; and
determining the second IF bandwidth as being equal to the second bandwidth.

12. A distributed antenna system (DAS), comprising:
a head-end equipment (HEE) configured to receive a first single-input single-output (SISO) signal and a second SISO signal; and
a plurality of remote antenna units (RAUs) communicatively coupled to the HEE by an optical fiber-based communications medium;
wherein at least one RAU among the plurality of RAUs comprises an adaptive multiple-input multiple-output (MIMO) communication system configured to:
receive and modulate the first SISO signal to generate a first radio frequency (RF) signal for distribution on a first RF band; and
receive and modulate the second SISO signal to generate a second RF signal for distribution on a second RF band that is different from the first RF band,
wherein the adaptive MIMO communication system comprises:
a MIMO baseband circuit, comprising:
a first MIMO path configured to distribute the first SISO signal;
a second MIMO path configured to distribute the second SISO signal;
a first quadrature modulator comprising a first SISO signal input coupled to the first MIMO path, the first SISO signal input configured to receive the first SISO signal; and
a second quadrature modulator comprising a second SISO signal input coupled to the second MIMO path, the second SISO signal input configured to receive the second SISO signal;
wherein:
the first quadrature modulator is configured to modulate the first SISO signal to generate the first RF signal for distribution on the first RF band based on a modulation frequency; and
the second quadrature modulator is configured to modulate the second SISO signal to generate the second RF signal for distribution on the second RF band that is different from the first RF band based on the modulation frequency;
a first in-phase (I)/quadrature (Q) signal generator (I/Q signal generator) configured to provide the first SISO signal to the first MIMO path;
a second I/Q signal generator configured to provide the second SISO signal to the second MIMO path;
a first filter coupled to the first quadrature modulator, the first filter configured to pass the first RF signal in the first RF band; and
a second filter coupled to the second quadrature modulator, the second filter configured to pass the second RF signal in the second RF band.

13. The DAS of claim 12, wherein:
the first RF band comprises a first center frequency and a first bandwidth; and
the second RF band comprises a second center frequency and a second bandwidth.

14. The DAS of claim 13, wherein the modulation frequency resides between the first center frequency of the first RF band and the second center frequency of the second RF band.

15. The DAS of claim 14, wherein the modulation frequency resides in the middle of the first center frequency of the first RF band and the second center frequency of the second RF band.

16. The DAS Hof claim 15, wherein:
the first SISO signal is received by the first SISO signal input on a first IF band;
the second SISO signal is received by the second SISO signal input on a second IF band;
the first IF band comprises a first IF center frequency and a first IF bandwidth, wherein:
the first IF center frequency is determined by subtracting the modulation frequency from the first center frequency; and
the first IF bandwidth is equal to the first bandwidth of the first RF band; and
the second IF band comprises a second IF center frequency and a second IF bandwidth, wherein:
the second IF center frequency is determined by subtracting the modulation frequency from the second center frequency; and
the second IF bandwidth is equal to the second bandwidth of the second RF band.

17. The DAS of claim 16, wherein the modulation frequency is lower than the first center frequency of the first RF band and the modulation frequency is higher than the second center frequency of the second RF band.

18. The DAS of claim 13, wherein:
the first SISO signal comprises a first I signal and a first Q signal;
the second SISO signal comprises a second I signal and a second Q signal;
the first quadrature modulator is further configured to modulate the first I signal and the first Q signal to generate the first RF signal for communicating on the first RF band; and
the second quadrature modulator is further configured to modulate the second I signal and the second Q signal to generate the second RF signal for communicating on the second RF band.

19. The DAS of claim 18, wherein:
a first IF modulator is configured to:
generate the first I signal based on a first digital I signal received from a digital signal processor (DSP); and
generate the first Q signal based on a first digital Q signal received from the DSP; and
a second IF modulator is configured to:
generate the second I signal based on a second digital I signal received from the DSP; and
generate the second Q signal based on a second digital Q signal received from the DSP.

20. The DAS of claim 12, wherein:
a first IF modulator comprises a zero-IF modulator configured to provide the first SISO signal to the first MIMO path;
the first IF modulator comprises a complex-IF modulator configured to provide the first SISO signal to the first MIMO path;
a second IF modulator comprises a zero-IF modulator configured to provide the second SISO signal to the second MIMO path; and
the second IF modulator comprises a complex-IF modulator configured to provide the second SISO signal to the second MIMO path.

21. The DAS of claim 14, wherein:
the HEE comprises an electrical-to-optical (E/O) converter and an optical-to-electrical (O/E) converter; and
each of the plurality of RAUs comprises a respective O/E converter and a respective E/O converter.

* * * * *